United States Patent [19]

Nishikawa et al.

[11] 4,275,798
[45] Jun. 30, 1981

[54] POWER STEERING APPARATUS

[75] Inventors: Masao Nishikawa, Tokyo; Toshihiko Aoyama, Saitama; Yoichi Sato, Fujimi, all of Japan

[73] Assignee: Honda Giken Kogyo Kabushiki Kaisha, Tokyo, Japan

[21] Appl. No.: 60,877

[22] Filed: Jul. 26, 1979

[30] Foreign Application Priority Data

Jul. 31, 1978 [JP] Japan ................ 53-93377

[51] Int. Cl.³ .................................... B62D 5/08
[52] U.S. Cl. ........................................ 180/143
[58] Field of Search ............. 180/143, 141, 142; 91/434, 371, 372, 370

[56] References Cited

U.S. PATENT DOCUMENTS

| | | | |
|---|---|---|---|
| 2,893,504 | 7/1959 | Jackson | 180/143 |
| 2,996,136 | 8/1961 | Nallinger et al. | 180/143 |
| 3,994,361 | 11/1976 | Nishikawa et al. | 180/143 |
| 4,000,785 | 1/1977 | Nishikawa et al. | 180/143 |

*Primary Examiner*—John P. Silverstrim
*Assistant Examiner*—Randall A. Schrecengost
*Attorney, Agent, or Firm*—Irving M. Weiner; Pamela S. Burt; John L. Shortley

[57] ABSTRACT

A power steering apparatus including a reaction control valve operable to be opened by a force proportional to a speed of a vehicle, and to be closed under a pressure in a reaction chamber. The pressure of a source of hydraulic pressure or a pressure proportional to the pressure of the hydraulic pressure source is applied so as to open the reaction control valve even when the vehicle speed exceeds a predetermined value. Thus, a steering reactive force, which would otherwise be limited at the predetermined speed of the vehicle, is controlled so as to be proportional at a proper ratio to a resistance from a road as it increases, thereby assuring more accurate steering of a vehicle.

10 Claims, 4 Drawing Figures

POWER STEERING APPARATUS

BACKGROUND OF THE INVENTION

1. Field of the Invention

The present invention relates to a power steering apparatus of the vehicle-speed-responsive type for increasing a steering reactive force as the speed of a vehicle increases.

2. Description of Relevant Art

Power steering apparatus hydraulically utilize power from an engine to provide the major portion of the steering force. However, a driver experiences difficulty in driving a vehicle provided with such power steering apparatus, in that he loses the feel of a steering force proportional to a resistance of a road on which he is operating the vehicle.

To solve such problem, there have been proposed and used a variety of reactive force transmission mechanisms or hydraulic pressure reaction chamber systems. However, such reaction chamber systems produce a steering force proportional to a road resistance. Such systems permits a road resistance to be transmitted to the driver when he is turning the steering wheel while the vehicle is being stopped, which is detrimental to smooth steering operation.

An attempt to eliminate such disadvantage of the known reaction chamber systems is disclosed in U.S. Pat. No. 3,994,361, which discloses a vehicle-speed-responsive type control system for controlling a steering reactive force in response to vehicle speed, rather than road resistance only.

With the known vehicle-speed-responsive type reaction control system, the operation thereof is limited up to a predetermined vehicle speed, and pressure in a reaction chamber is not capable of following an increase in road resistance at a speed above such predetermined speed.

In overcoming the foregoing disadvantages of known apparatus, the present invention provides more accurate steering in a power steering apparatus of the vehicle-speed-responsive type.

SUMMARY OF THE INVENTION

The present invention provides a power steering apparatus which permits the driver to turn the steering wheel with a light steering force, with no road resistance being transmitted to the driver, while the vehicle is being stopped or is running at a low speed. Further, the invention provides transmission of a steering responsiveness to the driver which is proportional to a road resistance while the vehicle is running at a high speed.

An object of the invention is to provide a power steering apparatus having a reaction control valve actuatable to be opened by a force in accordance with the speed of a vehicle and to be closed under a pressure in a reaction chamber. The arrangement is such that the pressure of a hydraulic pressure source or a pressure proportional to the pressure of the hydraulic pressure source is applied so as to open the reaction control valve while the car speed exceeds a predetermined vehicle speed.

Another object of the present invention is to provide a power steering apparatus in which pressure in a reaction chamber produced by the action of a reaction control valve will not be limited at a vehicle speed exceeding the predetermined vehicle speed, and the reaction control valve is controlled in proper proportion to an increase in road resistance, thereby transmitting the road resistance to the driver for better steering operation.

While the vehicle is running at a speed exceeding a predetermined speed, power steering is effected in the following manner. A proportional constant or ratio of a steering force to a road resistance is relatively high when the road resistance is low, and is relatively low when the road resistance is high. The high proportional ratio and the low proportional ratio are increased and reduced, respectively, as the vehicle speed is increased, thereby permitting the driver to experience a steering responsiveness or feel which is proportional to the road resistance, which responsiveness is strengthened as the vehicle speed is increased.

Another object of the invention is to provide a power steering apparatus having a hydraulic reaction chamber and a reaction control valve, the arrangement being such that pressure in the reaction chamber is increased as road resistance is increased after the reaction control valve has been actuated, while the vehicle is running at a speed which exceeds a predetermined speed. Thereby, an accurate steering responsiveness is transmitted to the driver.

A further object of the present invention is to provide a mechanism to be combined with a reaction control valve, for memorizing a portion of a characteristic for a vehicle speed faster than a predetermined vehicle speed, even when the vehicle speed is lowered below the predetermined speed during steering operation. The memorized information is eliminated only in response to returning movement of a steering wheel to its neutral position.

The above and other objects and advantages of the present invention will become apparent from the following description when taken in conjunction with the accompanying drawings which illustrate preferred embodiments of the present invention by way of example.

DETAILED DESCRIPTION OF PREFERRED EMBODIMENTS

Figure 1:
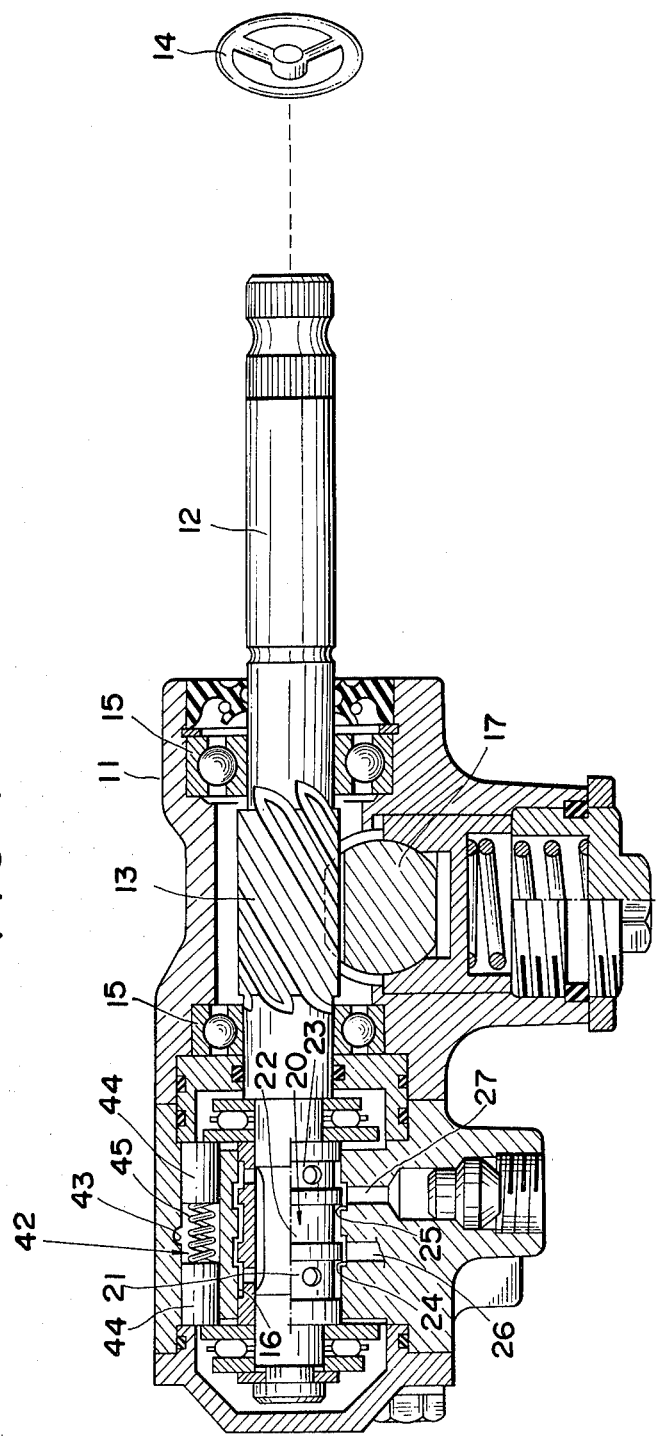
FIG. 1 is a longitudinal cross-sectional view of a gearbox.

As shown in FIG. 1, a gearbox 11 includes a pinion shaft 12 rotatably supported by a pair of bearings 15, 15 and disposed for axial sliding movement. A steering wheel 14 is coupled to an end of pinion shaft 12.

Figure 2:
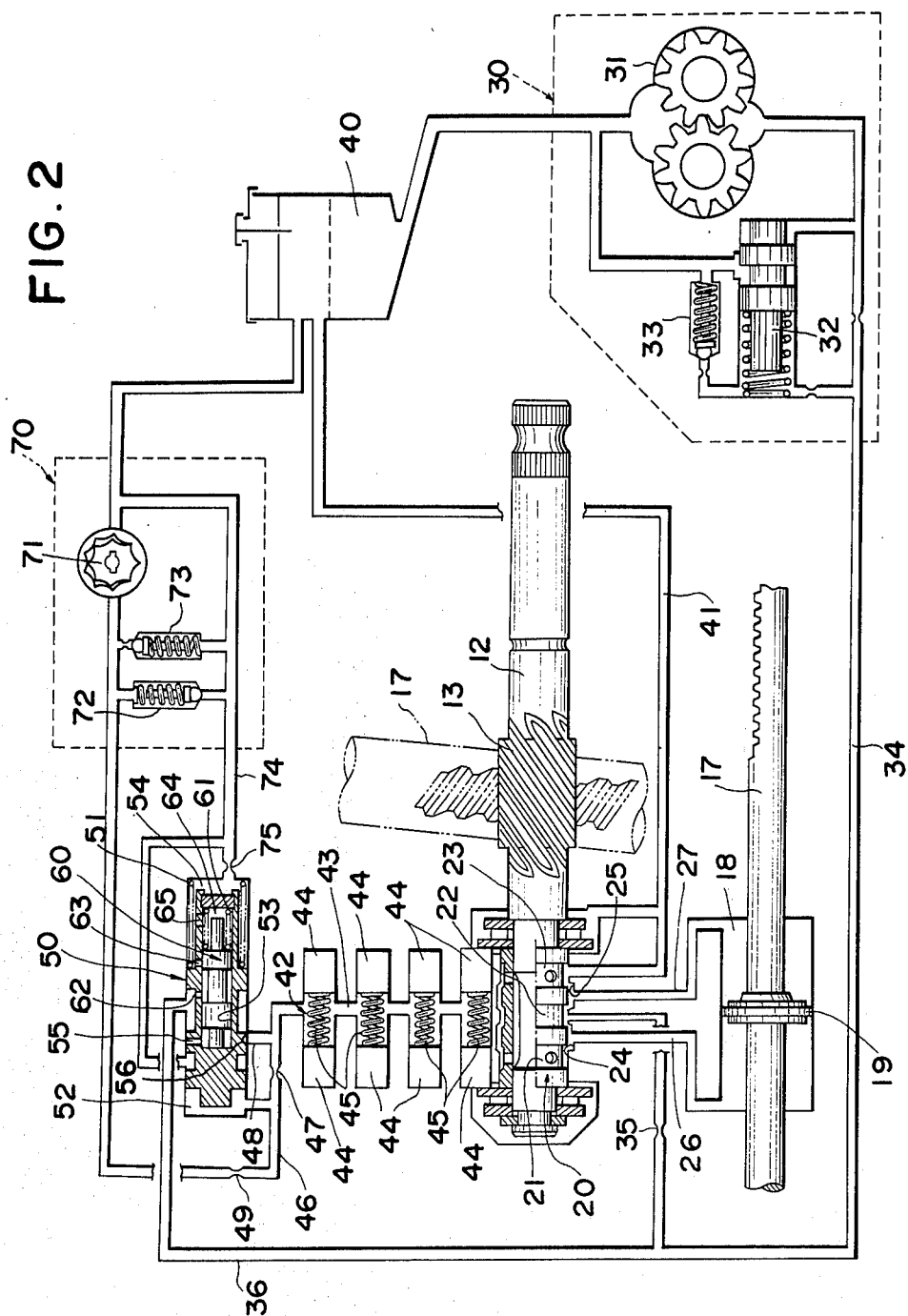
FIG. 2 is a diagrammatic view of a hydraulic circuit.

The pinion shaft 12 has disposed on the distal end thereof (the left-hand end in FIG. 1) a spool-type four-way control valve 20 coaxial with shaft 12, valve 20 having three circumferential annular grooves 21, 22, and 23. Groove 22, which is centrally disposed, is connected to a source of hydraulic pressure through a line 34 (FIG. 2) having an orifice 35. The grooves 21, 23 are connected to a reservoir 40 through a line 41. The valve 20 is slidably fitted in a bore 16 in gearbox 11. Bore 16 is defined by a wall having a pair of annular grooves 24, 25 which communicate via lines 26, 27, (FIG. 2) respectively, with chambers defined in a hydraulic cylinder 18 by a piston 19. As shown in FIG. 2, the piston 19 disposed in cylinder 18 is connected to a rack rod 17 having both ends operatively connected with vehicle wheels to be steered. Rack rod 17 has a rack portion meshing with a helical gear 13 on pinion shaft 12.

The valve 20 as positioned in a neutral location shown in FIG. 1 comprises an open-center valve, with grooves 21, 22, 23 thereof and grooves 24, 25 of bore 16 overlapping each other. When valve 20 is disposed in such position, hydraulic oil from the hydraulic source 30 is permitted to return to reservoir 40 substantially without throttling.

A plurality of hydraulic reaction chambers 42, four in the embodiment illustrated in FIG. 2, are disposed circumferentially in bore 16 around valve 20, the chambers 42 being held under the same pressure by a line 43. Each of the reaction chambers 42 includes a pair of plungers 44, 44 and a neutral return spring 45 disposed therebetween. The reaction chambers 42 are operative for expansion by springs 45 and for contraction by movement of valve 20 in either direction.

When steering wheel 14 is turned, a steering torque acts on pinion shaft 12, which is then subjected to an axial force, the degree of which depends on the degree and direction of the steering torque. When the axial force exceeds a predetermined force from springs 45 in hydraulic reaction chambers 42, valve 20 is moved against the spring force rightwardly or leftwardly from the illustrated position, thereby selectively connecting one of the chambers in cylinder 18 to hydraulic source 30 and the other chamber to reservoir 40 for a desired degree of power assistance.

As illustrated in FIG. 2, the orifice 35 is disposed in line 34 and disposed between valve 20 and hydraulic source 30. The reaction chambers 42 are connected to the discharge side of hydraulic source 30 through a communication passage 43, a reaction control valve 50, and a branch line 36 disposed upstream of orifice 35 in line 34. The hydraulic source 30 is of a known structure comprising an engine-driven pump 31, a flow control valve 32, and a pilot relief valve 33 for feeding oil from reservoir 40 to line 34.

The reaction control valve 50 has a structure as disclosed, for example, by U.S. Pat. No. 3,994,361. The valve 50 includes a spring 51 for urging valve 50 to open so as to connect reaction chambers 42 to line 36. The valve 50 is closed by hydraulic pressure transmitted to a chamber 52 from a line portion downstream of an orifice 47 in a line 46 for returning pressurized oil from reaction chambers 42 to reservoir 40 through a vehicle speed sensor 70.

The reaction control valve 50 further includes a hollow or chamber 53 in which a vehicle-speed-responsive valve 60 is slidably and coaxially fitted. The valve 60 is closed by spring 61 to block communication between a chamber 54 housing spring 51 and the hydraulic source 30, and can be opened by hydraulic pressure transmitted from reaction chambers 42 through a branch line 48 upstream of orifice 47, a circumferential groove 56, and a port 55 communicating with a front portion of chamber 53. The chamber 54 is connected to reservoir 40 via an orifice 75 and a line 74, and communicates with hydraulic source 30 through an orifice defined by ports 62, 63 which can be opened and closed by vehicle-speed-responsive valve 60 disposed in reaction control valve 50, and through lines 36, 34. The orifice 75 has a diameter slightly larger than that of ports 62, 63, and acts as a control orifice for reaction control valve 50.

The chamber 54 communicates through a port 65 with a chamber 64 in which is disposed the spring 61 of vehicle-speed-responsive valve 60, the chambers 54, 64 being held under the same pressure.

The vehicle speed sensor 70 is disposed in line 46 between orifice 47 and reservoir 40. The sensor 70 discharges oil from line 46, and comprises a hydraulic motor 71 with the speed of rotation thereof controlled by meshing gears so as to be proportional to the speed of a vehicle, a one-way valve 72 for preventing a negative pressure in line 46 when motor 71 rotates beyond the rise of hydraulic pressure in line 46, and a relief valve 73 for preventing the pressure in line 46 from building up excessively during rearward movement of a vehicle when motor 71 acts as a pump to back oil into line 46. The relief valve 73 also acts to prevent a failure of sensor 70 when excessive hydraulic flow is supplied to line 46 with vehicle-speed-responsive valve 60 being operated. An orifice 49 of a relatively large diameter may be disposed in line 46 downstream of orifice 47 when it is necessary to lower the relief pressure for preventing an excessive force from acting on sensor 70.

Figure 4:
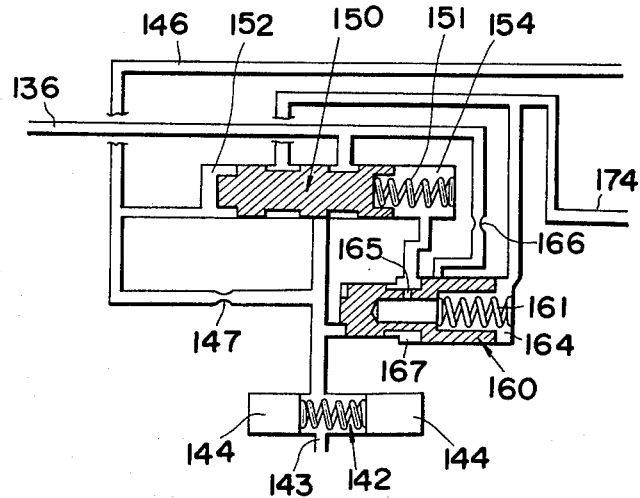
FIG. 4 is a fragmentary diagrammatic view of a modified hydraulic circuit having a memory device.

Although the speed-responsive valve 60 is shown as being assembled in reaction control valve 50, valve 60 may be separately constructed as shown in FIG. 4.

In FIG. 4, parts which function in the same manner as those described with respect to the preceding embodiment are similarly numbered, and have a prefix of 1.

When hydraulic pressure in a reaction chamber 142 reaches a predetermined value, a vehicle speed-responsive valve 160 is moved rightwardly in FIG. 4, permitting hydraulic pressure to be transmitted via an orifice 166 into a spring chamber 154 of a reaction control valve 150. The chamber 154 communicates with reservoir 40 described hereinabove through an outlet orifice in the form of a port 165 in vehicle speed-responsive valve 160, a chamber 164, and a line 174 connected to an outlet opening of chamber 164, functioning in substantially the same manner as in the first embodiment. In the present second embodiment, however, the speed-responsive valve 160 is provided with different diameters with a step portion 167 disposed therebetween. After valve 160 has opened, or has been moved rightwardly, it is urged to an open position under the hydraulic pressure in spring chamber 154.

The operation of the apparatus is as follows. During turning movement of steering wheel 14 while the vehicle is stopped, hydraulic oil in line 36 supplied under pressure from hydraulic source 30 is subject to a throttling resistance of 3 to 5 kg/cm$^2$, for example, at orifice 35, and has a working pressure equal thereto. At the same time, with sensor 70 not discharging oil, the chamber 52 is subjected to the same pressure as reaction chambers 42 with no differential pressure produced across orifice 47. (Initially, while hydraulic source 30 is not operating, the reaction control valve 50 is open with its leftmost end in contact with the wall of chamber 52, permitting smooth communication between line 36 and line 48.) Thus, by presetting spring 51 at a bias force lower than the working pressure of line 36 or at 2 kg/cm$^2$ for example, the reaction control valve 50 is closed, with the pressure in reaction chambers 42 slightly exceeding the preset bias force of spring 51 or approximately 2 kg/cm$^2$ in the present instance, and the reaction chambers 42 are held at this pressure. When a steering torque is imposed on pinion shaft 12, valve 20 is switched rightwardly or leftwardly with the light steering torque which overcomes the force of spring 45 and the preset pressure of, for example, approximately 2 kg/cm$^2$ which jointly produce a force tending to return the valve to the neutral position. Because the torque is independent of the resistance from a road surface, the apparatus is governed by a characteristic represented by 0–a$_0$–V$_0$ in FIG. 3. Thus, light steering action is assured while the car is stopped.

Figure 3:
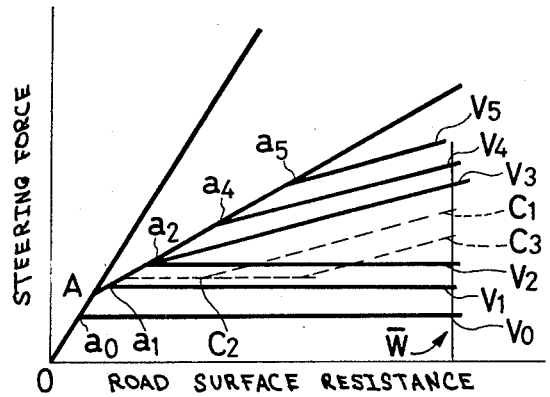
FIG. 3 is a graph showing characteristics of a power steering apparatus.

FIG. 3 depicts a graph showing characteristics of the apparatus according to the present invention, the graph having a horizontal axis representing road surface resistance, a vertical axis representing steering force, and a basic characteristic line O–A representing a manual steering without hydraulic assistance.

Steering Operation at Low Vehicle Speeds

During steering operation while the vehicle is running at a low speed, vehicle speed sensor 70 operates at a low speed to discharge hydraulic oil from line 46 into reservoir 40, with the result that there is a pressure difference of $\Delta P_1$ developing across orifice 47. On the other hand, at a very low speed, the reaction control valve 50 is initially closed with pressure in chamber 52 overcoming in a balanced manner the preset bias force of spring 51, since the reaction chambers 42 can accommodate the pressure loss across orifice 47 until this pressure loss plus the balancing pressure in chamber 52 reaches the working pressure in line 36. At such speed, the valve 50 remains balancedly closed even when the road resistance increases, keeping constant the pressure in reaction chambers 42 and the steering force, while the cylinder 18 operates accordingly with the control valve 20 shifted in either direction. However, at a low critical speed, the valve 50 enters into a state in which it is initially open; such critical point being represented by A in FIG. 3. At a slightly higher but still low speed of V$_1$, the valve 50 does not close until the pressure in chamber 52 again overcomes spring 51 with pressure in reaction chambers 42 increased proportional to road resistance; thereafter, the valve 50 stays balancedly closed, thus again keeping the steering force constant irrespective of an increase in road resistance. Therefore, a pressure in reaction chambers 42 necessary to close reaction control valve 50 becomes higher by $\Delta P_1$ than the pressure required for steering when the vehicle is stopped. The apparatus then has a characteristic of 0–a$_1$–V$_1$ shifting to 0–a$_2$–V$_2$ as the vehicle speed changes. From 0 to the point A in FIG. 3, the reaction control valve 50 remains open while the vehicle runs straight at a speed above a predetermined value or the low critical speed. During valve shifting movement from the open position to the closed position (from A to a$_1$ or A to a$_2$), a pressure which develops in the cylinder 18 and a pressure difference across orifice 35 is transmitted to reaction chambers 42, thereby producing a steering force proportional to a road resistance.

The foregoing operation is known in the art, and does not necessarily constitute an essential part of the present invention.

Steering Operation at Moderate or Higher Vehicle Speeds

When the vehicle is moving straight at a speed exceeding a high critical speed of V$_2$, reaction control valve 50 is in the open position. As the wheels begin to be steered, a resistance they receive from the road increases and pressure in reaction chamber 42 also increases. When this pressure reaches a value determined by spring 61 of vehicle-speed-responsive valve 60, the pressure as transmitted from reaction chambers 42 through line 48, circumferential groove 56 and port 55 into a left space of chamber 53 balancingly opens the valve 60, i.e., pushes it away rightwardly in FIG. 2, and a pressure is introduced from hydraulic source 30 via line 36, and ports 62, 63, into spring chamber 54 of reaction control valve 50. Because chamber 54 communicates via orifice 75 and line 74 with reservoir 40, the pressure in chamber 54 is controlled to build up, in proportion to the pressure in line 36, to one-tenth of the latter for example, thus additionally urging reaction control valve 50 toward the open position thereof. Because the pressure acting on the left-hand chamber 52 required to close reaction control valve 50 is then to be built up with the road resistance, the pressure in reaction chambers 42 also continues to build up with the road resistance, thus giving an inclined characteristic straight line. It will be easily understood that the steering force goes down along this characteristic line as the road resistance again decreases, till the pressure in the left space of chamber 53 is overcome by bias force of spring 61 plus hydraulic pressure in chamber 64, then further goes down along the line including a$_2$ and A and the manual line 0–A.

The rate of the pressure increase is represented in FIG. 3 by a$_2$–V$_3$ more gradually than A–a$_2$, the incline of the line a$_2$–V$_3$ being determined by the aperture of orifice 75 and ports 62, 63. The larger the diameter of orifice 75, the more gradual the incline becomes. Conversely, the larger the diameter of ports 62, 63, the steeper the incline becomes. The steering force is no longer kept constant relative to the road resistance for steering operation at such speed. The driver is provided with better responsiveness to changes in road resistance than previously provided. A tendency to bring the line a$_2$–V$_3$ into conformity with the line A–a$_2$ makes steering operation sluggish, reducing driving comfort.

As the vehicle speed continues to increase, a larger amount of hydraulic oil is discharged from line 46 by sensor 70, delaying the starting of closing of reaction control valve 50. The point a$_2$ is shifted gradually to the points a$_4$, a$_5$, thereby enlarging the area A–a$_2$. While the speed-responsive valve 60 is balancedly opened, the pressure in line 46 is permitted to increase because the valve 50 is also balancedly opened and transmitting pressure corresponding to road resistance into reaction chambers 42, whereupon relief valve 73 is opened to protect sensor 70.

Instead of using the orifice 75 and ports 62, 63 to control the hydraulic pressure for urging valve 50 to the open position, the pressure through the valve 60 may act directly on valve 50. In such case, the pressure-receiving area of the valve may be reduced, for example, to one-tenth of the original area. However, the use of orifice 75 and ports 62, 63 to relieve the pressure from the hydraulic source to reservoir 40 is more advantageous, as set forth hereinbelow.

When steering wheel 14 is fully turned, valves 33, 32 in hydraulic source 30 may open to permit pressurized oil to circulate in the source 30, resulting in heat generation and parts which stick together. By discharging pressurized oil through orifice 75, cooled oil is supplied from reservoir 40 into pump 31, reducing the possibility of the parts becoming stuck together.

It should be understood that the vehicle-speed-responsive valve 60 need not necessarily be hydraulically operated, but may comprise a solenoid valve arranged to open and close the line in response to electrial detection of a vehicle speed. Furthermore, the four-way valve and the reaction chamber are not limited to the precise structure disclosed hereinabove.

According to the modification shown in FIG. 4, the vehicle-speed-responsive valve 160 has a hysteresis due to the step portion 167, which urges the valve 160 toward the open position thereof, for keeping the in-line of a characteristic line of original speed, even after the vehicle speed is lowered, once the valve 160 is lifted to the open position. For example, as the vehicle speed is reduced with a steering angle under a road resistance of W, the steering force is shifted gradually to point $C_1$ or $C_3$ as determined from the pressure difference across orifice 147 according to the change in vehicle speed. Accordingly, as the road resistance decreases a reduced vehicle speed corresponding to the point 1 for example, the steering force decreases from this point to another point $C_2$ along a straight line parallel to the characteristic line of original speed till it meets a transverse characteristic line of a speed at which the valve 160 closes, and is never shifted down directly to a point on an original transverse characteristic line of the reduced speed, because the valve 160 once opened permits hydraulic pressure from line 136 to continuously and additionally urge reaction control valve 150 toward the closed position. Thus, a more natural steering responsiveness is attained. Such memory will not be eliminated until the steering wheel is returned sufficiently near the neutral position to permit the pressure in the reaction chamber to be lowered to a predetermined value.

Although in the illustrated embodiments the reaction control valve is controlled by a motor which is rotatable in proportion to vehicle speed, it is contemplated that the valve may be controlled by the pressure (positive) afforded by a governor in an automatic transmission mechanism.

According to the invention, after the reaction control valve has actuated when the vehicle speed exceeds a predetermined value, the pressure in the reaction chamber increases gradually with the road resistance so as to enable the driver to gain an improved steering responsiveness or feel. Such arrangement can be provided by adding the speed-responsive-valve to the reaction chamber system and the reaction control mechanism which are known in the art, without requiring substantial modification of the conventional hydraulic circuit.

Although preferred embodiments of the present invention have been shown and described in detail hereinabove, it should be understood that various changes and modifications may be made therein without departing from the scope of the appended claims.

We claim:

1. In a power steering apparatus for a vehicle, comprising:
   a hydraulic source (30) for supplying hydraulic fluid to a supply line (34, 36, 136);
   a hydraulic cylinder (18) having two chambers therein defined by a piston (19) arranged to provide hydraulic assistance for a steering linkage (12, 17);
   a directional control valve (20) slidable so as to selectively connect one chamber in said hydraulic cylinder to said supply line and the other chamber in said hydraulic cylinder to a reservoir (40) in response to turning movement of a steering wheel (14) operatively connected to said steering linkage, and to provide communication between said supply line and said reservoir in the neutral position of said valve (20);
   a plurality of hydraulic reaction chambers (42, 142) having respective plungers (44, 144) and first biasing means (45) normally urging said directional control valve toward said neutral position, said chambers (42, 142) communicating through a common passage (43, 143);
   a reaction control valve (50, 150) connected between said supply line and said common passage, and movable toward the closed position thereof by hydraulic fluid pressure in a first chamber (52, 152) and normally urged toward the open position thereof by a second biasing means (51, 151) in a second chamber (54, 154), said first chamber being connected to an exhaust line (46, 146) communicating through a first orifice (47, 147) with said common passage; and
   a vehicle speed sensor (70) connected to the downstream side of said exhaust line for discharging hydraulic fluid in proportion to vehicle speed;
   the improvement comprising:
   a hydraulic passage including a valve means (60, 160) provided between said supply line (34, 36, 136) and said second chamber (54, 154), said reaction control valve (50, 150) being further urged toward the open position thereof by hydraulic fluid pressure thus introduced into said second chamber (54, 154); and
   said valve means (60, 160) being movable toward the open position thereof by hydraulic fluid pressure in a third chamber connected to said common passage (43, 143) and normally urged toward the closed position thereof by a third biasing means (61, 161) in a fourth chamber (64, 164).

2. A power steering apparatus according to claim 1, wherein:
   said hydraulic passage is provided with at least one second orifice (62, 63, 166) between said supply line (34, 36, 136) and said valve means (60, 160); and
   said second chamber (54, 154) is provided with an outlet orifice (75, 165).

3. A power steering apparatus according to claim 2, wherein:
   said valve means is slidably fitted in a hollow (53) including said third chamber and said fourth chamber (64).

4. A power steering apparatus according to claim 3, wherein:
   said hollow (53) is formed in said reaction control valve (50).

5. A power steering apparatus according to claim 2, wherein:
   said outlet orifice (165) communicates with said fourth chamber (164); and
   said fourth chamber (164) is provided with an outlet opening.

6. A power steering apparatus according to claim 1, 2 or 5, wherein:
   said valve means (160) is provided with a step portion (167) urged toward the open position of said valve means (160) by hydraulic fluid pressure in said second chamber (154).

7. A power steering apparatus according to claim 1, wherein:
   an orifice (35) is disposed between said supply line (34, 36, 136) and said directional control valve (20).

8. A power steering apparatus according to claim 2, wherein:
  upon movement of said valve means (60) to the open position thereof by fluid pressure in said third chamber connected to said common passage (43), hydraulic fluid pressure is transmitted via said at least one second orifice (62, 63) to said second chamber (54); and
  said outlet orifice (75) of said second chamber (54) is connected to said reservoir (40).

9. A power steering apparatus according to claim 3, wherein:
  said second chamber (54) communicates with said fourth chamber (64) through a port to permit said second chamber (54) and said fourth chamber (64) to be held under substantially the same fluid pressure.

10. A power steering apparatus according to claim 5, wherein:
  said outlet orifice (165) of said second chamber (154) is connected through said fourth chamber (164) and said outlet opening of said fourth chamber to said reservoir (40).

* * * * *